(12) United States Patent
Minase et al.

(10) Patent No.: US 6,625,098 B1
(45) Date of Patent: Sep. 23, 2003

(54) OVERHEAT PREVENTION OF A SOLENOID OR THE LIKE IN A CD-ROM DRIVE OR THE LIKE

(75) Inventors: Minoru Minase, Iruma (JP); Shigeru Fukinuki, Kokubunji (JP)

(73) Assignee: TEAC Corporation (JP)

( * ) Notice: Subject to any disclaimer, the term of this patent is extended or adjusted under 35 U.S.C. 154(b) by 592 days.

(21) Appl. No.: 09/583,033

(22) Filed: May 30, 2000

(30) Foreign Application Priority Data

May 31, 1999 (JP) .......................................... 11-151263

(51) Int. Cl.⁷ ................................................ G11B 5/58
(52) U.S. Cl. ...................................................... 369/53.2
(58) Field of Search ........................... 369/30.36, 30.27, 369/53.2, 53.37, 75.2, 30.17, 44.29, 44.28, 44.14, 13.19

(56) References Cited

U.S. PATENT DOCUMENTS 4,409,639 A * 10/1983 Wesner ........................ 361/167
5,621,717 A * 4/1997 Finkelstein et al. ..... 369/112.16
5,844,866 A   12/1998 Fujimoto et al. .............. 369/50
6,064,640 A *  5/2000 Shinoda et al. ............. 369/75.2

FOREIGN PATENT DOCUMENTS

JP         7-235415         9/1995

* cited by examiner

*Primary Examiner*—William Korzuch
*Assistant Examiner*—Kimlien T Le
(74) *Attorney, Agent, or Firm*—Woodcock Washburn LLP (57) ABSTRACT

A CD-ROM drive has a disk tray ejectable from a data transfer position within a casing, where the disk is read, to a load/unload position outside the casing where the disk is loaded on and unloaded from the tray. Being locked in the data transfer position against the bias of an ejector spring, the tray is ejected by being unlocked by brief energization of a solenoid under the direction of a controller. The solenoid might overheat to self-destruction if, upon malfunctioning of the controller, it were left energized after tray ejection. A protection circuit is therefore provided for permitting a solenoid driver circuit to energize the solenoid in response to an ejection command from the controller only when the tray is in the data transfer position.

9 Claims, 9 Drawing Sheets

OVERHEAT PREVENTION OF A SOLENOID OR THE LIKE IN A CD-ROM DRIVE OR THE LIKE

BACKGROUND OF THE INVENTION

This invention relates to electronic devices such as rotating disk data storage devices as typified by CD-ROM drives as incorporated particularly in laptop or notebook computers. More specifically, the invention pertains to a safety system for preventing the accidental overheating of an electric actuator in such electronic devices, an example of such electric actuator being a solenoid customarily used in a CD-ROM drive for unlocking the tray for ejection together with or without a CD-ROM disk loaded thereon.

The CD-ROM drive has found widespread use as a computer peripheral with the advent and ever-increasing commercial acceptance of CD-ROM databases, as disclosed for example in Fujimoto et al. U.S. Pat. No. 5,844,866. As incorporated specifically in a laptop computer, for example, the CD-ROM drive has a movable tray for carrying the optical disk into and out of the disk drive casing. Usually, the tray has mounted thereto an optical pickup assembly for reading the disk loaded on the tray, a disk drive motor for imparting rotation to the disk, and a pickup drive motor for moving the pickup assembly across the track turns on the disk. Together with all these components, as well as with the disk, if any, loaded thereon, the tray travels between a data transfer position within the disk drive casing, where the pickup assembly reads the disk in rotation on the tray, and a load/unload position where the tray is mostly exposed outside the casing for permitting the disk to be loaded thereon or unloaded therefrom.

A familiar example of means for causing such tray travel is an ejector spring biasing the tray from data transfer position toward load/unload position. The ejector spring is used in combination with a locking mechanism for locking the tray in the data transfer position against the bias of the ejector spring. Japanese Unexamined Patent Publication No. 7-235415 suggests use of a solenoid in the locking mechanism. The solenoid is left unenergized when the tray is in the data transfer position, permitting the locking mechanism to lock the tray in that position. Upon depression of an eject button on the front bezel of the CD-ROM drive casing, the solenoid is energized to cause the locking mechanism to unlock the tray, permitting the same to be spring ejected to the load/unload position.

Also as is well known, the CD-ROM drive incorporates a controller, which includes a central processor, for controlling the solenoid of the locking mechanism and various other working parts of the disk drive such as the disk drive motor and the pickup drive motor. The controlling of the various working components of the CD-ROM drive by the controller has had a problem left unsolved in conjunction with the solenoid of the tray locking mechanism.

Functioning normally, the controller causes the solenoid to be energized for tray ejection as aforesaid and to be deenergized immediately upon tray ejection. The solenoid is therefore energized only at the moment of tray ejection, being held deenergized when the tray is in either the data transfer or the load/unload position. No heat problem is to occur as a result of solenoid energization as long as the controller is functioning normally.

Let it be supposed, however, that the controller malfunctions for some reason or other and, as has been liable to occur heretofore, allows the solenoid to be kept energized even after tray ejection. The solenoid has then overheated, possibly damaging or destroying itself, the neighboring parts thereof, particularly those molded from plastics, and, of course, the disk which is vulnerable to heat, even though the disk together with the tray is now assumed to have been ejected and so to be positioned some distance away from the overheating solenoid.

This kind of trouble is not limited to CD-ROM drives. It can happen in other comparable electronic devices, such for example as magnetic disk drives and printers, having a solenoid or other electric actuators operating under the direction of a microcontroller.

SUMMARY OF THE INVENTION

The present invention seeks, in a CD-ROM drive and other electronic devices having an electric actuator to be energized and deenergized under the control of a controller, to protect the actuator from overheating as a result of energization for an extended period of time due to the malfunctioning of the controller.

The invention also seeks, in attaining the first recited object, to make utmost use of the preexisting parts of a CD-ROM drive or like electronic device and to make it proof against overheating of the actuator without any major alteration of the conventional mechanical construction or electric circuitry.

Briefly stated in its perhaps broadest aspect, the present invention concerns an electronic device having a stationary segment and a movable segment, the movable segment being movable relative to the stationary segment between a first and a second position. The invention particularly concerns, in such electronic device, the combination comprising drive means for moving the movable segment from the first toward the second position relative to the stationary segment, the drive means including electric actuator means which, when activated, at least causes the movable segment to start traveling from the first toward the second position. Also included are a sensor for sensing whether the movable segment is in the first position or not, and a controller for providing a signal for activating and deactivating the actuator means. The invention particularly features a protection circuit having an input connected to the sensor, another input connected to the controller, and an output connected to the actuator means, for permitting the controller to activate the actuator means only when the movable segment is in the first position.

Thus, even in the event of controller malfunctioning, the actuator means is not to be left energized after the movable segment has traveled away from the first toward the second position. There is accordingly no danger of the actuator means, or even the complete device, ruined by the overheating of the actuator means.

In the preferred embodiments of this invention to be disclosed subsequently, in which the invention is applied to a CD-ROM drive, the disk tray is the primary component of the movable segment, and the casing of the disk drive that of the stationary segment. The tray travels between a data transfer position within the casing and a load/unload position outside the casing. The electric actuator means comprises a solenoid to be energized and deenergized by a solenoid driver circuit under the direction of a controller. When energized, the solenoid unlocks the tray and so permits the same to travel from the data transfer toward the load/unload position under the force of an ejector spring. The protection circuit constituting a feature of this invention has two inputs connected to the controller and a tray sensor, and an output connected to the solenoid driver circuit, for permitting the driver circuit to energize the solenoid in response to an ejection command from the controller only when the tray is in the data transfer position.

The protection circuit takes the form of a simple OR gate in one embodiment, and an inhibit AND gate in another, depending upon whether the controller goes high or low for tray ejection. The invention is applicable to CD-ROM drives of known constructions merely by incorporating this simple protection circuit in their electric circuitry.

The above and other objects, features and advantages of this invention and the manner of achieving them will become more apparent, and the invention itself will best be understood, from a study of the following description and attached claims, with reference had to the accompanying drawings showing the preferred embodiments of the invention.

DESCRIPTION OF THE PREFERRED EMBODIMENTS

Figure 1:
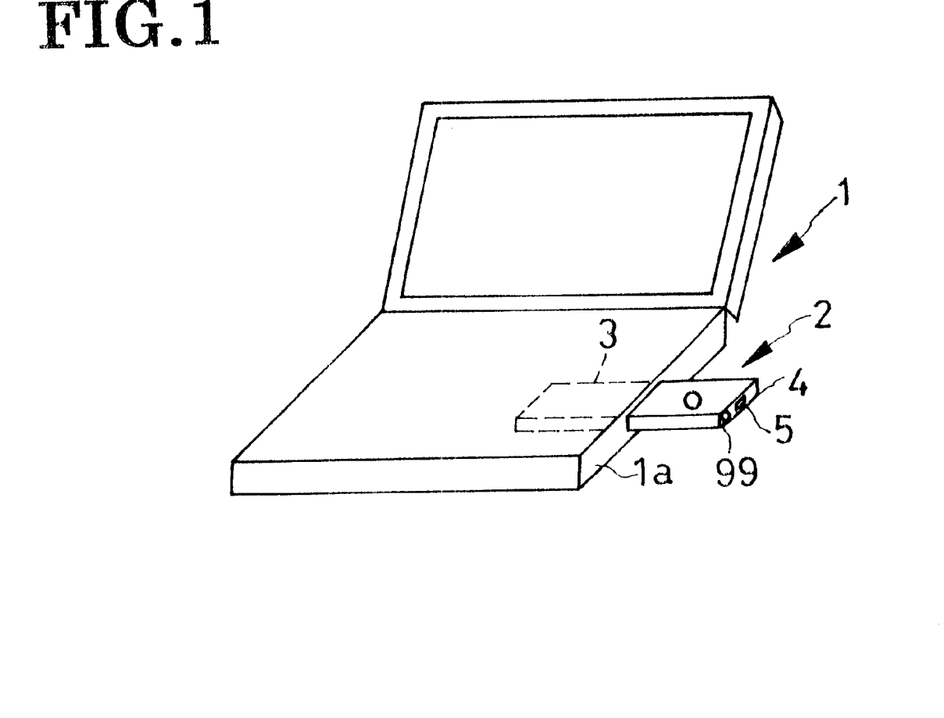
FIG. 1 is a perspective view of a laptop computer having built into it a CD-ROM drive according to the invention, the CD-ROM drive being herein shown with its tray ejected.
Figure 2:
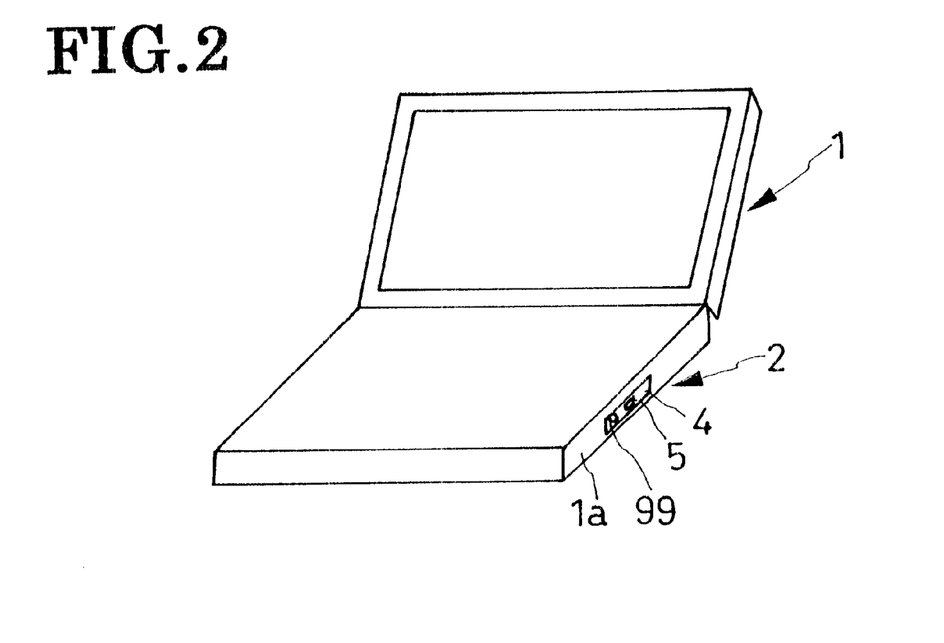
FIG. 2 is a view similar to FIG. 1 except that the tray is shown pushed into the computer housing.

The present invention is currently believed to be best embodied in a CD-ROM drive, particularly that integrally built into a laptop computer as an external data storage device. FIGS. 1 and 2 show such a laptop computer system 1 with an inbuilt CD-ROM drive 2. For convenience of explanation the CD-ROM drive 2 is broadly classifiable into a stationary segment 3, which is infixed within the housing 1a of the computer system 1, and a movable segment 4 which is movable out of the computer housing, as pictured in FIG. 1, and back into the computer housing as in FIG. 2. A CD-ROM, or prerecorded optical disk, is to be loaded on and unloaded from the movable segment 4 when the latter is ejected, and is to be read after being pushed therewith into the computer housing 1a. Thus the FIG. 1 position of the movable segment 4 is herein referred to as the load/unload position, and the FIG. 2 position thereof as the data transfer position.

The user may depress an eject switch 5 for disk loading or unloading. The movable segment 4 of the CD-ROM drive 2, which has been locked in the data transfer position, will be unlocked and sprung out of the computer housing 1a upon depression of the eject switch 5, but only to such an extent as to be manually pulled further to the load/unload position.

Figure 3:
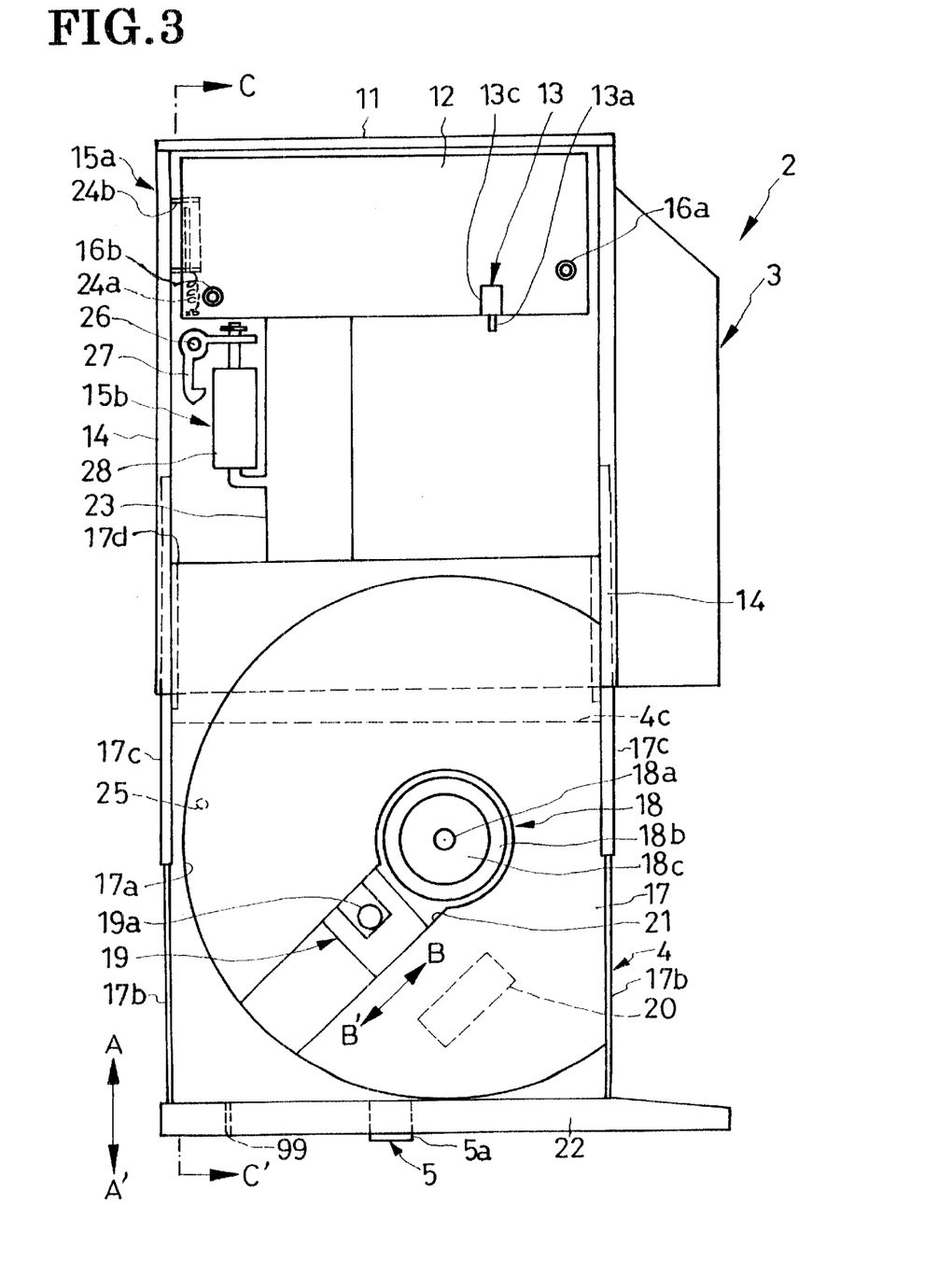
FIG. 3 is an enlarged top plan of the CD-ROM drive of FIGS. 1 and 2 with the tray ejected, the view not showing the top of the CD-ROM drive casing to reveal the parts contained therein.

As illustrated in more detail and on an enlarged scale in FIG. 3, the stationary segment 3 of the CD-ROM drive 2 comprises: (a) a metal-made CD-ROM drive casing 11; (b) a printed circuit board 12; (c) a tray sensor 13 for indicating the position of a tray, to be introduced later in more detail, which constitutes the primary component of the movable segment 4; (d) a pair of tray guides 14 for guiding the travel of the tray between the data transfer and the load/unload. position; (e) an ejector mechanism 15a for ejecting the movable segment 4; and (f) a locking mechanism 15b for locking the movable segment in the data transfer position.

Screwed at 16a and 16b to the CD-ROM drive casing 11, the printed circuit board 12 has mounted thereon the various components of the CD-ROM drive circuitry to be set forth subsequently. The casing 11 is in the shape of a box opening forwardly, or downwardly as viewed in FIG. 3, and having a top seen at 11a in FIGS. 4 and 5. This casing top 11a is not shown in FIG. 3, however, to reveal the parts enclosed in the casing 11.

The movable segment 4 of the CD-ROM drive 2 comprises: (a) a tray 17 for carrying a CD-ROM disk; (b) a disk drive motor 18 for imparting rotation to the disk on the tray; (c) an optical pickup assembly or transducer 19 for reading the rotating disk on the tray; (d) a pickup drive motor 20 for moving the pickup assembly across the track turns on the disk; and (e) a front bezel 22 capable of closing the noted open front end of the CD-ROM drive casing 11 when the movable segment 4 is in the data transfer position.

The tray 17 has formed therein a depression 17a of approximately circular shape for accommodating the disk. As revealed by FIGS. 4 and 5, the tray 17 is mounted on a pair of metal-made carrier plates 4a and 4b for joint movement therewith between the two positions. The carrier plates 4a and 4b are spaced from each other in a top-to-bottom direction in these figures and joined fast to each other via a boss or bosses 4d The disk drive motor 18, pickup assembly 19, and pickup drive motor 20 are all mounted to the underside of the upper carrier plate 4b.

With reference back to FIG. 3 the tray 17 has formed therein a keyhole opening 21 extending approximately radially of the CD-ROM disk positioned thereon to expose the disk drive motor 18 and the pickup assembly 19. More specifically, there are exposed through the keyhole opening 21 the usual objective lens 19a of the pickup assembly 19, a spindle 18a coupled directly to the disk drive motor 18, a turntable 18b mounted fast to the spindle, and a boss 18c formed on the turntable for engagement with the CD-ROM disk. The pickup assembly 19 is driven back and forth along the opening 21 by the pickup drive motor 20, as indicated by the double-headed arrow marked B–B'.

For traveling out of and back into the CD-ROM drive casing 11, the tray 17 has its pair of opposite side edges 17b slidably engaged in a pair of elongate sliding shoes 17c which in turn are slidably engaged in a pair of guideways 14 formed by the CD-ROM drive casing. Thus the tray 17, or the complete movable segment 4, travels between the two required positions as the pair of side edges 17b of the tray slide along the guideways 14 via the sliding shoes 17c, as indicated by the double-headed arrow A'A' in FIG. 3. The sliding shoes 17c assure smooth travel of the tray 17, preventing it from sagging under its own weight in the load/unload position.

Figure 4:
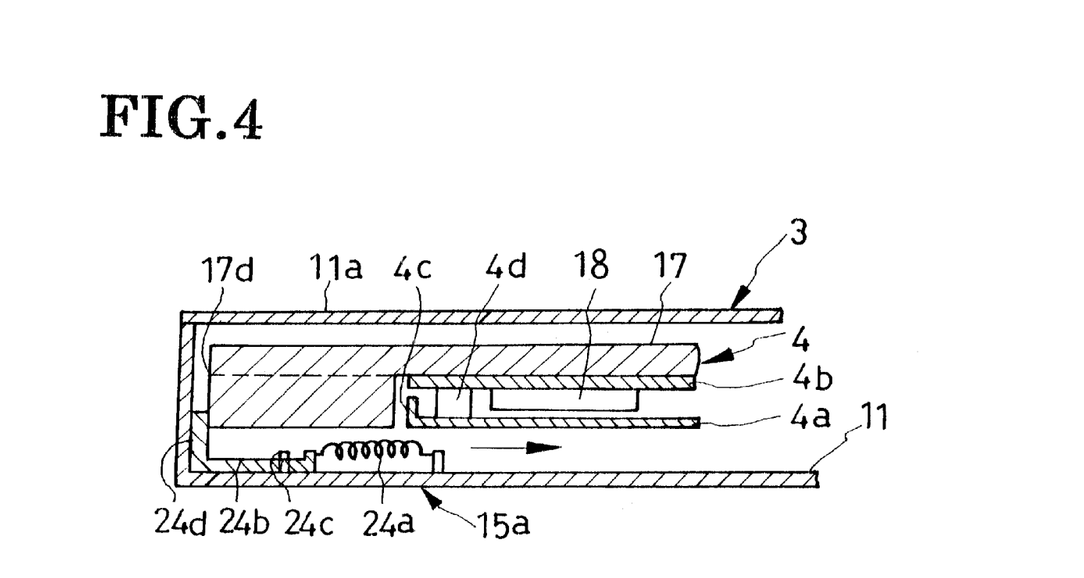
FIG. 4 is a fragmentary section taken along the line C–C' in FIG. 3, the view showing the tray in the data transfer position within the CD-ROM drive casing.

The tray 17 is indicated in the load/unload position by the solid lines in FIG. 3. Not only the tray 17 but also the turntable 18b and the boss 18c in particular are exposed outside the CD-ROM drive casing 11 in this load/unload position, so that the CD-ROM disk may be readily loaded on and unloaded from the tray 17, receiving the boss 18c in its center hole when being loaded thereon. When the tray 17 is pushed into the CD-ROM drive casing 11, on the other hand, assuming the data transfer position as shown in FIG. 4 for example, the tray and all the other components of the movable segment 4 are thoroughly received in the CD-ROM drive casing 11. The components of the movable segment 4 are fully protected in this position, in which, moreover, such movable parts as the turntable 18b, boss 18c, and pickup assembly 19, as well as the CD-ROM disk itself, present no hazard to the user.

At 13 in FIG. 3 is indicated the tray sensor including a sensor switch 13c The sensor switch 13c is to be actuated upon arrival of the tray 17 at the data transfer position, as then the back 4c of the carrier plate 4a pushes the actuator 13a of the sensor switch. The output signal of the tray sensor 13 will then indicate that the tray 17 is in the data transfer position.

The locking mechanism 15b locks the tray 17 in the data transfer position in a manner to be detailed subsequently. Then, upon depression of an eject button 5a on the front bezel 22, the locking mechanism 15b wilt unlock the tray 17, permitting the same to travel toward the load/unload position by the action of the ejector mechanism 15a. The output from the tray sensor 13 will now indicate tray ejection.

Figure 5:
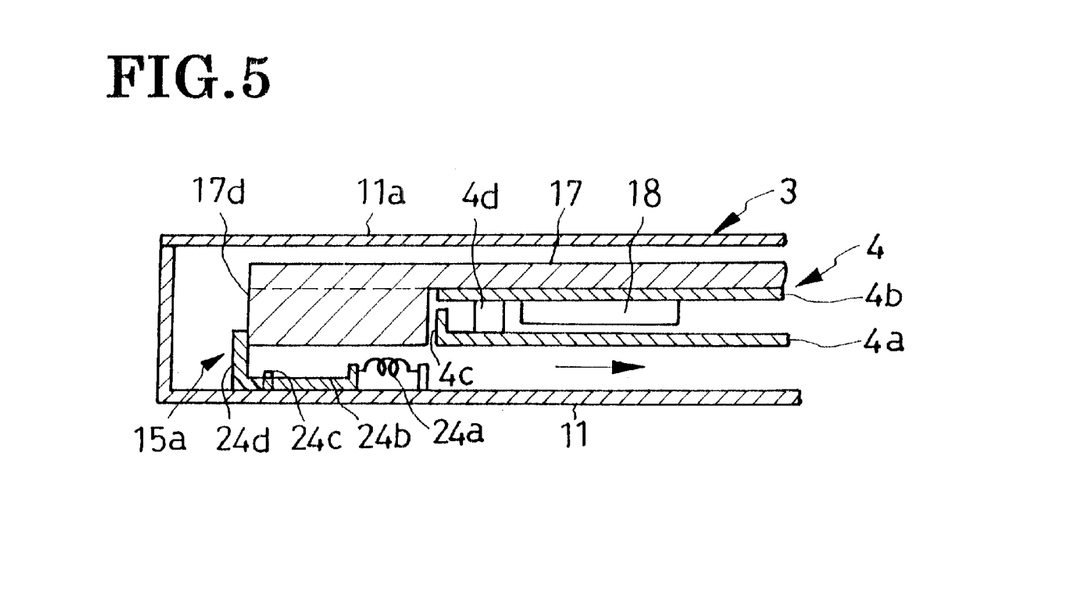
FIG. 5 is a view similar to FIG. 4 except that the tray is shown ejected toward the load/unload position.

As best pictured in FIGS. 4 and 5, the ejector mechanism 15a includes a helical tension spring 24a, hereinafter referred to as the ejector spring, which is anchored at one end to the CD-ROM drive casing 11 and engaged at another end with a slide 24b. Slidably mounted on the bottom of the CD-ROM drive casing 11, the slide 24b is movable in the direction of the double-headed arrow A–A', FIG. 3, by being guided by a guide pin 24c erected on the casing bottom. The slide 24b is L-shaped to engage a fin 17d depending from the tray 17.

When the tray 17 is pushed fully to the data transfer position, the slide 24b will moved to the FIG. 4 position by its depending fin 17d, resulting in the extension of the ejector spring 24a and the consequent storage of energy therein. The tray 17 will be locked as aforesaid by the locking mechanism 15b in this data transfer position. Then, upon being unlocked, the tray 17 will travel with the slide 24b from the FIG. 4 position to that of FIG. 5 by virtue of the energy that has been stored in the ejector spring 24a. The FIG. 5 position is, however, far short of the load/unload position, so that the tray 17 may be manually pulled from that FIG. 5 position to the load/unload position of FIG. 3. It is understood that the tray 17, the pair of sliding shoes 17c, and the pair of guideways 14 are so shaped and so interrelated to each other as to prevent the tray from running out of the CD-ROM drive casing 11, positively retaining the tray in the load/unload position.

Figure 6:
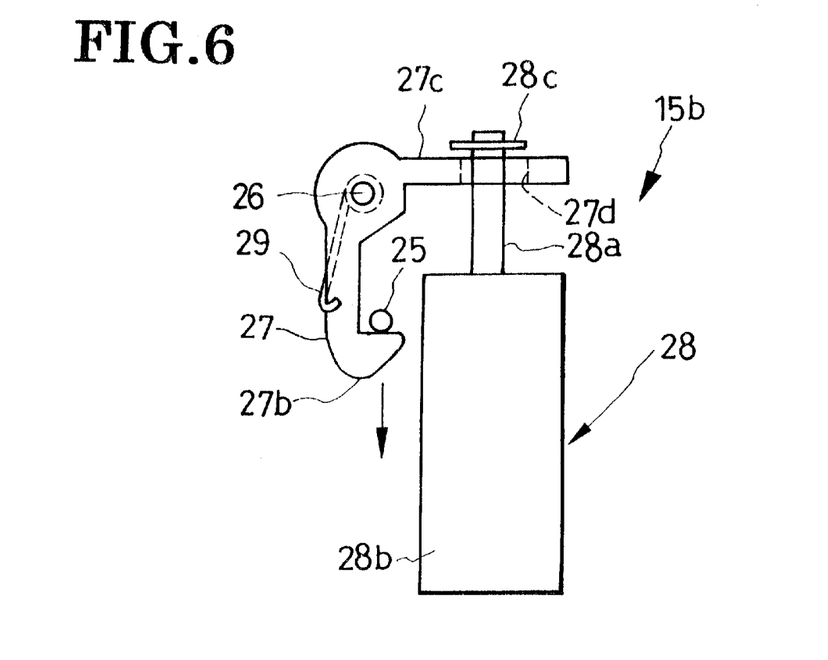
FIG. 6 is a still more enlarged top plan of the tray locking mechanism seen in FIG. 3, the locking mechanism being shown locking the pin movable with the tray which is not shown here.
Figure 7:
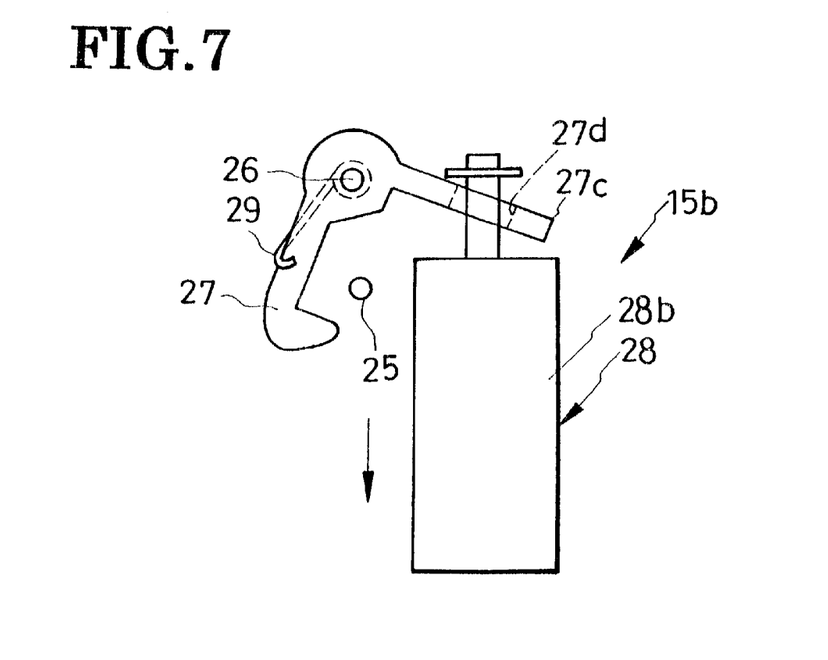
FIG. 7 is a view similar to FIG. 6 except that the locking mechanism is shown unlocking the pin.

Although the locking mechanism 15b, which locks the tray 17 in the data transfer position, appears in FIG. 3, it is better illustrated on an enlarged scale in FIGS. 6 and 7. The locking mechanism 15b includes a hook 27 pinned at 26 on the bottom of the CD-ROM drive casing 11 for pivotal motion between a FIG. 6 position, in which the hook is in locking engagement with a depending pin 25 of the movable segment 4, and a FIG. 7 position in which the hook releases the pin. A torsion spring 29 is coiled upon the pivot pin 26 and has one end engaged with the hook 27 for biasing the same counterclockwise, as viewed in these figures, from its FIG. 7 position to that of FIG. 6.

Thus, when the movable segment 4 travels to the data transfer position, the hook 27 positively engages the pin 25 of the movable segment under the force of the torsion spring 29 thereby locking the same in the load/unload position. It will be noted that the distal end portion of the hook 27 is shaped to provide a cam edge 27b. Toward the end of the travel of the movable segment 4 toward the data transfer position, its depending pin 25 will hit the cam edge 27b of the hook 27 and subsequently relatively slide thereover, causing the hook to turn clockwise, as seen in FIGS. 6 and 7, against the bias of the torsion spring 29 until the pin travels past the cam edge and is engaged by the hook 27 under the spring bias. Thus is the tray 17 locked in the data transfer position.

Adopted for causing the hook 27 to unlock the pin 25, and hence to permit the tray 17 to be ejected, is an electric actuator shown as a solenoid 28 in FIGS. 6 and 7. The solenoid 28 comprises a plunger 28a and a coil assembly 28b. The plunger 18a extends with clearance through a slot 27d in an arm 27c which is formed in one piece with the hook 27. The plunger 28a has a flange 28c formed on its end for engaging the arm 27c.

The solenoid 28 is held unenergized when the tray 17 is locked in the data transfer position as in FIG. 6. The plunger 28a is then forced out of the coil assembly 28b as the hook 27 engages the movable pin 25 under the influence of the torsion spring 29. Upon energization of the solenoid 28, and consequent retraction of the plunger 28a into the coil assembly 28b, the arm 27c will turn from its FIG. 6 position to that of FIG. 7 thereby causing the hook 27 to unlock the pin 25 against the force of the spring 29.

As has been mentioned in connection with the prior art, the solenoid 28 is energized only for a brief moment necessary for unlocking the tray 17, under the control of an electronic controller to be set forth presently. As long as the controller is functioning normally, therefore, the solenoid 28 will be left unenergized not only when the tray is locked in the data transfer position as in FIG. 6 but also after it has been ejected. The instant invention particularly concerns how to preclude the possible overheating of the solenoid 28 as a result of prolonged energization in the event of controller malfunctioning. How this objective is accomplished will become apparent from the subsequent disclosure of the electric circuitry of this 2.

The noted front bezel 22, a part of the movable segment 4, is joined to the carrier plate 4a, FIG. 4. The eject button 5a on this front bezel 22 is to be actuated for tray ejection through energization of the solenoid 28. Also formed in the front bezel 22 is a manual or emergency ejection hole 99. A pin, not shown, is to be manually inserted in and through this hole 99 for unlocking the locking mechanism 15b in cases where normal unlocking by the solenoid 28 is impossible for some trouble.

Figure 8:
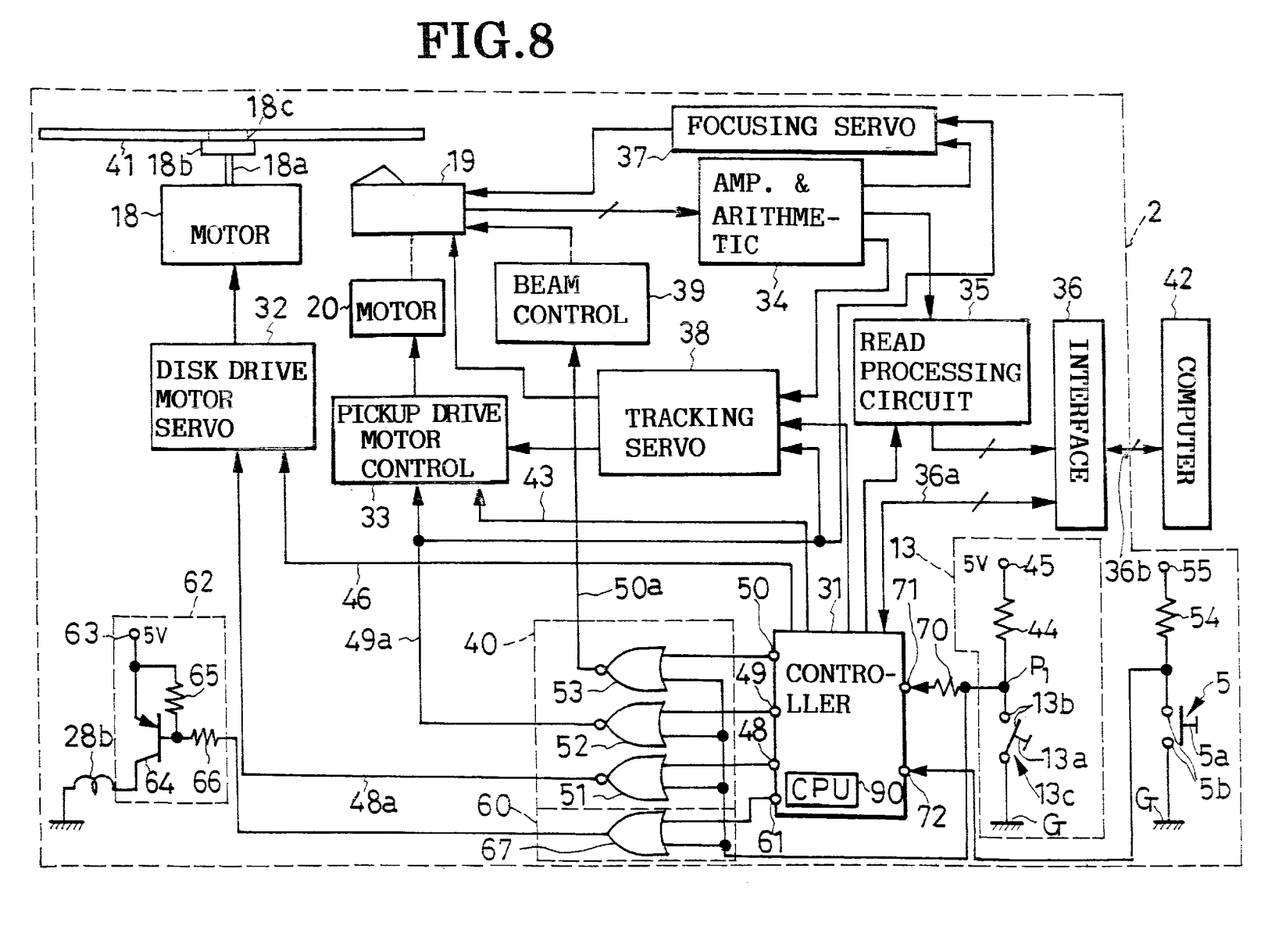
FIG. 8 is a block diagram of the electric circuitry of the FIGS. 1 and 2 CD-ROM drive.

The reader's attention is now invited to FIG. 8 for a discussion of the electric circuitry of the CD-ROM drive 2. The circuitry includes the following components which have been already set forth: eject switch 5, tray sensor 13, solenoid 28, disk drive motor 18, optical pickup assembly 19, and pickup drive motor 20. Additionally, the CD-ROM drive circuitry comprises a controller 31, a disk drive motor servo circuit 32, a pickup drive motor control circuit 33, an amplifier and arithmetic circuit 34, a read signal processing circuit 35, an interface 36, a focusing servo circuit 37, a tracking servo circuit 38, a light beam control circuit 39, a safety circuit 40, a solenoid protection circuit 60 according to this invention, and a solenoid driver circuit 62.

Also seen in FIG. 8 is the CD-ROM disk 41 which is shown mounted on the turntable 18b on the spindle or armature shaft 18a of the disk drive motor 18. The disk 41 has data prerecorded thereon, the data being encoded in the form of a multiturn spiral of minute bumps impressed into the disk surface. The data is conventionally read as the pickup assembly 19 irradiates the disk surface with a beam of light and receives the reflection of the beam from the disk surface.

Although not illustrated in detail because of its conventional nature, the pickup assembly 19 is understood to comprise, typically, a diode laser, a photodetector comprised of a plurality (e.g. six) of photodiodes, a tracking actuator, a focusing actuator, and so forth. The diode laser emits a beam of light for reading the disk 41 under the control of the beam control circuit 39.

The photodiodes constituting the photodetector of the pickup assembly 19 are connected to the amplifier and arithmetic circuit 34, which comprises amplifiers, adders, and subtracters. Inputting the electric outputs from the photodiodes, the circuit 34 puts out a read signal, a focusing control signal, and a tracking control signal.

The read signal processing circuit 35 comprises a waveshaping circuit, a phase-locked loop circuit, a demodulator circuit, and so forth. The read signal from the amplifier and arithmetic circuit 34 is thereby formatted into read data suitable for delivery to the computer 42 via the interface 36. The computer 42 in this case is the computer proper of the laptop computer system shown in FIGS. 1 and 2.

The focusing control signal is directed from the amplifier and arithmetic circuit 34 to the focusing servo circuit 37, which responds by putting out a drive signal for the unshown focusing actuator of the pickup assembly 19. The focusing actuator conventionally operates to keep the laser beam focused on the surface of the CD-ROM disk 41 by moving the objective 19a, FIG. 3, of the pickup assembly 19 toward and away from the disk surface. The controller 31 is connected to the focusing servo circuit 37 for on-of control of the focusing servo and a change in phase compensation characteristic.

The tracking control signal is directed from the amplifier and arithmetic circuit 34 to the tracking servo circuit 38, causing the same to put out a drive signal for the unshown tracking actuator of the pickup assembly 19 accordingly. The tracking actuator conventionally operates to keep the laser beam spot in centerline alignment with the data track on the surface of the CD-ROM disk 41 by moving the objective 19a in a direction parallel to the disk surface. The controller 31 is connected to the tracking servo circuit 38, too, for on-off control of the tracking servo, a change in phase compensation characteristic, and jumping control of the laser beam.

The pickup drive motor control circuit 33 is connected to the pickup drive motor 20 for causing the same to move the pickup assembly 19 to any desired track position on the disk 41 along the slot 21, FIG. 3, in the tray 17. In so controlling the pickup drive motor 20, the motor control circuit 33 relies on seek data supplied from the controller 31 over a line 43, and a pickup drive control signal from the tracking servo circuit 38.

The eject switch 5, previously set forth with reference to FIG. 3 as being positioned on the front bezel 22 of the disk tray 17, is shown in FIG. 8 as comprising, in addition to the eject button 5a, a pair of fixed contacts 5b both to be engaged by the eject button upon depression thereof. The contact pair 5b is connected between supply terminal 55 and ground G via a pullup resistor 54. The eject signal supplied from this switch 5 to the input 72 of the controller 31 goes low upon depression of the eject button 5a. The controller 31 responds to this low input signal by causing, via the solenoid protection circuit 60, the solenoid driver circuit 62 to actuate the solenoid 28.

Including a central processor (CPU) 90, the controller 31 is connected by way of a bus 36a, interface 36, and another bus 36b to the computer 42 for performing various control functions under its direction.

The tray sensor 13, previously mentioned in connection with FIG. 3, is connected via a resistor 70 to the input 71 of the controller 31 for supplying thereto a signal indicative of whether the tray 17 is in the data transfer position or not. The tray sensor 13 is herein shown as comprising a sensor switch 13c connected between a supply terminal 45 and the ground G via a pullup resistor 44. The sensor switch 13c comprises an switch actuator 13a and a normally open contact pair 13b. One of the contacts 13b is connected to the supply terminal 45, from which is supplied a unidirectional voltage of, say, five volts, via the resistor 44 of, say, 10 kilohms, the other contact being grounded. The junction $P_1$ between resistor 44 and sensor switch 13c is connected via the resistor 70 to the controller input 71, besides being connected directly to both safety circuit 40 and solenoid protection circuit 60.

Thus the output $P_1$ of the tray sensor 13 will go low when the sensor switch 13c is closed by the travel of the tray 17 to the data transfer position, and high upon ejection of the tray. The sensor switch 13c could be modified, however, to provide a signal that was high when the tray was in the data transfer position, and low upon tray ejection. In this case, either a NOT circuit might be connected between the tray sensor 13 and the safety circuit 40 and protection circuit 60, or these safety circuit and protection circuit might be modified in construction accordingly.

Figure 9:
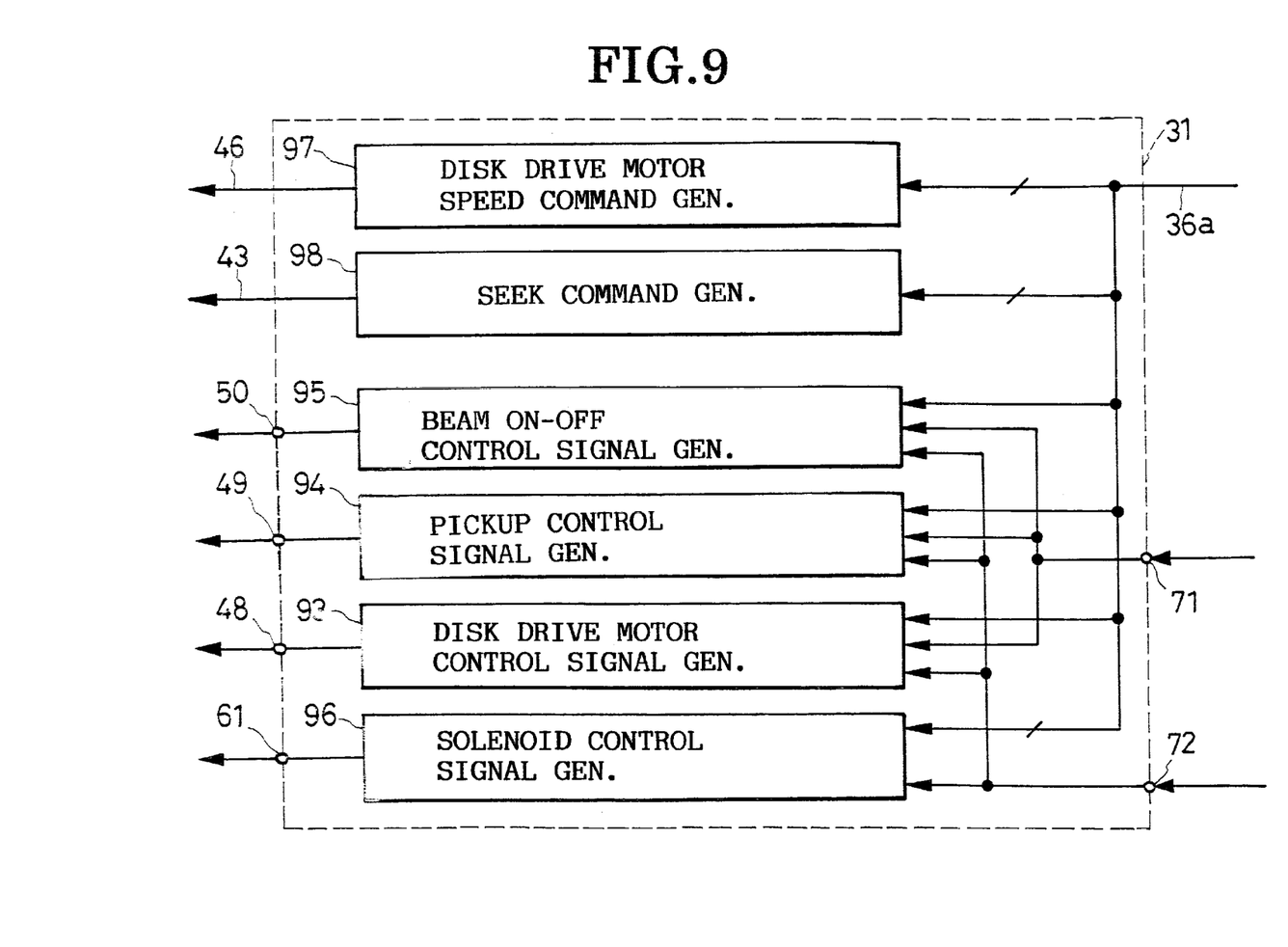
FIG. 9 is an equivalent block diagram explanatory of some pertinent functions of the controller of the FIG. 8 electric circuitry.

The controller 31 may be envisioned as being constructed as functionally or equivalently block diagramed in FIG. 9. Essentially, it comprises a disk drive motor control signal generator 93, a pickup control signal generator 94, a beam on-off control signal generator 95, a solenoid control signal generator 96, a disk drive motor speed command generator 97, and a seek command generator 98.

Having inputs connected to the tray sensor 13, FIG. 8, the eject switch 5, and the interface 36, the disk drive motor control signal generator 93 provides a signal for on-off control of the disk drive motor 18, for delivery from a controller output 48 to the disk drive motor servo circuit 32 via the safety circuit 40. The disk drive motor control signal goes low, setting the disk drive motor 18 in rotation, in response to a disk drive command from the interface 36 or computer 42 or to the closure of the tray sensor switch 13c, and high, setting the disk drive motor out of rotation, in response to a disk stop command from the interface or computer, to the actuation of the eject switch 5, or to the opening of the tray sensor switch.

The pickup control signal generator 94 provides a signal for on-off control of, despite its naming, not only the pickup drive motor 20 but also the focusing and tracking actuators, which are both built into the pickup assembly 19. Also having inputs connected to the tray sensor switch 13, the eject switch 5, and the interface 36, the pickup control signal generator 94 delivers the on-off control signal from a controller output 49 to the pickup drive motor control circuit 33, the focusing servo circuit 37, and the tracking servo circuit 38 via the safety circuit 40. The on-off control signal from the generator 94 goes low, setting the pickup drive motor and the focusing and tracking actuators in operation, in response to a drive command for the pickup drive motor 20 or for the focusing servo circuit 27 or for the tracking servo circuit 38 from the interface 36 or computer 42 or to the closure of the tray sensor switch 13c, and high, setting the pickup drive motor and the focusing and tracking actuators out of operation, in response to a stop command for the pickup drive motor 20 or for the focusing servo circuit 37 or for the tracking servo circuit 38 from the interface or computer, to the actuation of the eject switch 5, or to the opening of the tray sensor switch.

Also connected to all of the tray sensor switch 13, the eject switch 5, and the interface 36, the beam on-off control signal generator 95 provides a signal for on-off control of the diode laser included in the pickup assembly 19, for delivery from a controller output 50 to the beam control circuit 39 via the safety circuit 40. The beam on-off control signal goes low, causing the laser beam to be emitted, in response to a beam-on command from the interface 36 or computer 42 or to the closer of the tray sensor switch 13c, and high, causing the laser to stop beam emission, in response to a beam-off command from the interface or computer, to the actuation of the eject switch 5, or to the opening of the tray sensor switch.

Having inputs connected only to the eject switch 5 and the interface 36, the solenoid control signal generator 96 delivers a signal for on-off control of the solenoid 28 of the tray locking mechanism 15b, FIGS. 6 and 7, from a controller output 61 to the solenoid driver circuit 62 via the solenoid protection circuit 60. The solenoid control signal generator 96 causes the solenoid driver circuit 62 to energize the solenoid 28 in response to an ejection command from the interface 36 or the computer 42 or to the manual actuation of the eject switch 5. It is understood that, as has been known heretofore, the controller 31 is so constructed that the solenoid 28 is energized shortly after the disk drive motor servo circuit 32, pickup drive motor control circuit 33 and beam control circuit 39 are all set out of operation by the signals from the other controller outputs 48, 49 and 50.

The disk drive motor speed command generator 97 has but one input connected to the interface 36 or computer 42. The generator 97 delivers a speed command, indicative of the desired speed of rotation of the disk drive motor, to the disk drive motor servo circuit 32 over a line 46.

Also having but one input connected to the interface 36 or computer 42, the seek command generator 98 delivers a seek command to the pickup drive motor control circuit 33 over the line 43.

With reference back to FIG. 8 the solenoid driver circuit 62 comprises a switching transistor 64 of pnp type, connected between five-volt supply terminal 63 and solenoid coil 28b, and two resistors 65 and 66. The transistor 64 has its emitter connected to the supply terminal 63, its collector connected to the solenoid coil 28b, and its base connected via the resistor 66 to the solenoid protection circuit 60. The other resistor 65 is connected between the emitter and base of the transistor 64. Consequently, the transistor 64 becomes conductive when the output from the protection circuit 60 is low, thereby causing the solenoid coil 28b to be energized from the supply terminal 63.

The solenoid protection circuit 60 is shown as a simple OR gate 67 in this embodiment of the invention. The OR gate 67 has one input connected to the eject signal output 61 of the controller 31, another input connected to the output $P_1$ of the tray sensor 13, that is, to the junction between sensor switch 13c and pullup resistor 44.

The eject signal from the controller output 61 will go low upon actuation of the eject switch 5, causing the solenoid driver circuit 62 to energize the solenoid coil 28b. As has been explained with reference to FIGS. 6 and 7, the solenoid 28 when so energized causes the hook 27 of the locking mechanism 15b to unlock the movable pin 25, permitting the tray 17 to be ejected by the force of the ejector spring 24a, FIGS. 4 and 5. The eject signal will go high immediately when the tray sensor switch 13c opens as the tray 17 starts traveling from the data transfer toward the load/unload position as above. Then the solenoid driver circuit 62 will deenergize the solenoid coil 28b.

Thus, as long as the controller 31 is functioning normally, the solenoid 28 will give rise to no heat problem at all, even without the protection circuit 60, being energized for a brief period of time from the actuation of the eject switch 5 to the opening of the tray sensor switch 13c.

Being not totally free from malfunctioning, however, the controller 31 may fail to respond correctly to the opening of the tray sensor switch 13c upon tray ejection. The eject signal from the controller output 61 will then remain low. In that case, were it not for the protection circuit 60, the switching transistor 64 of the solenoid driver circuit 62 would remain conductive, holding the solenoid coil 28b energized for an indefinitely extended period of time. The result would be the overheating of the solenoid to the point of self-destruction.

The protection circuit 60 according to this invention precludes the danger of solenoid overheating in the event of controller malfunctioning. Even if the eject signal from the malfunctioning controller 31 remains low after the tray sensor switch 13c has opened upon tray ejection, the resulting high output from the tray sensor 13 will be applied to the other input of the OR gate 67 of the protection circuit 60. This protection circuit will then go high, canceling, so to say, the erroneously low state of the eject signal and causing nonconduction through the transistor 64 of the solenoid driver circuit 62. Thus, in the face of the malfunctioning controller 31, the solenoid 28 will be deenergized immediately upon detection of tray departure from the data transfer position by the tray sensor 13.

A malfunctioning controller, not correctly responding to the opening of the tray sensor switch 13c upon tray ejection, would give rise to additional problems, which are very objectionable from the standpoint of user safety, if the safety circuit 40 were not provided. In the absence of this safety circuit the malfunctioning controller would allow the disk drive motor 18 and the pickup drive motor 20 to remain in rotation with the disk 41, and the pickup assembly 19 to continue beam emission, on the ejected tray 17.

In order to eliminate such potential hazard to the user, the safety circuit 40 comprises three NOR gate 51, 52 and 53. The first NOR gate 51 has one input connected to the controller output 48, another input connected to the output $P_1$ of the tray sensor 13, and an output connected to the disk drive motor servo circuit 32 by way of a line 48a The second NOR gate 52 has one input connected to the controller output 49, another input connected to the tray sensor output $P_1$, and an output connected by way of a line 49a to all of the pickup drive motor control circuit 33, the focusing servo circuit 37, and the tracking servo circuit 38. The third NOR gate 53 has one input connected to the controller output 50, another input connected to the tray sensor output $P_1$, and an output connected to the beam control circuit 39 by way of a line 50a.

Operating normally, the controller 31 will make its outputs 48, 49 and 50 go high in response to the actuation of the eject switch 5 or to an eject command from the computer 42, thereby deactivating the disk drive motor 18, pickup drive motor 18, focusing servo circuit 37, tracking servo circuit 38, and beam control circuit 39. The controller outputs 48, 49 and 50 will all go low for activating these components.

In response to the actuation of the eject switch 5 or to an eject command from the computer 42, the controller 31 will make its outputs 48, 49 and 50 go high, as above, shortly before commencement of tray ejection. Such high outputs will make the NOR gates 51, 52 and 53 go low regardless of the output from the tray sensor 13. It is understood that the disk drive motor servo circuit 32, pickup drive motor control circuit 33, focusing servo circuit 37, tracking servo circuit 34, and beam control circuit 39 become operative when their input lines 48a, 49a and 50a are high, and inoperative when these input lines are low. As a result, all these components are rendered inoperative by the low outputs from the NOR gates 51, 52 and 53.

Thereafter the controller 31 will cause the solenoid driver circuit 62 to energize the solenoid 28 for tray ejection. The disk drive motor 18 in particular has been at least deenergized by the time the tray 17 reaches the load/unload position. The exposed tray will pose no hazard to the user.

The safety circuit 40 is effective not only when the tray 17 is ejected by actuation of the eject switch 5 or by application of an eject command from computer 42 to controller 31, as above, but also when the tray is emergency ejected, that is, when the tray is unlocked by insertion of a pin in the hole 99, FIG. 3, in the front bezel 22. The tray sensor switch 13c will open when the tray 17 is emergency ejected. The resulting high output from the tray sensor 13 will make the NOR gates 51–53 go low irrespective of the other inputs thereto from the controller outputs 48–50, deactivating the disk drive motor 18, pickup drive motor 20, and so forth. These components will thus become inoperative immediately when the tray 17 is sprung toward the load/unload position.

The safety circuit 40 is further well calculated not to interfere with the output signals of the controller 31 when the latter is functioning normally. The controller 31 will make its outputs 48–50 go low for activating the components in question. These components should be activated only when the tray 17 is in the data transfer position, that is, when the tray sensor switch 13c is closed. The sensor output $P_1$ is low when the tray is in the data transfer position. Since then both inputs to each of the NOR gates 51–53 are low, their outputs will be high, activating the motors 18 and 20 and other components.

Notwithstanding the showing of FIG. 8, however, only one NOR gate could be employed in place of the three NOR gates 51, 52 and 53. The safety circuit output lines 48a, 49a and 50a might then be all connected to the single NOR gate.

The resistor 70 between tray sensor output $P_1$ and controller input 71 also serves to prevent continued energization of the solenoid 28 in the event of controller malfunctioning. The controller 31 when malfunctioning may hold its input 71 low when the sensor switch 13c is open, that is, when the tray 17 is ejected. Then the resistor 70 will function to minimize a potential drop of the tray sensor output $P_1$, holding its potential sufficiently high to cause deenergization of the solenoid 28.

Second Form

Figure 10:
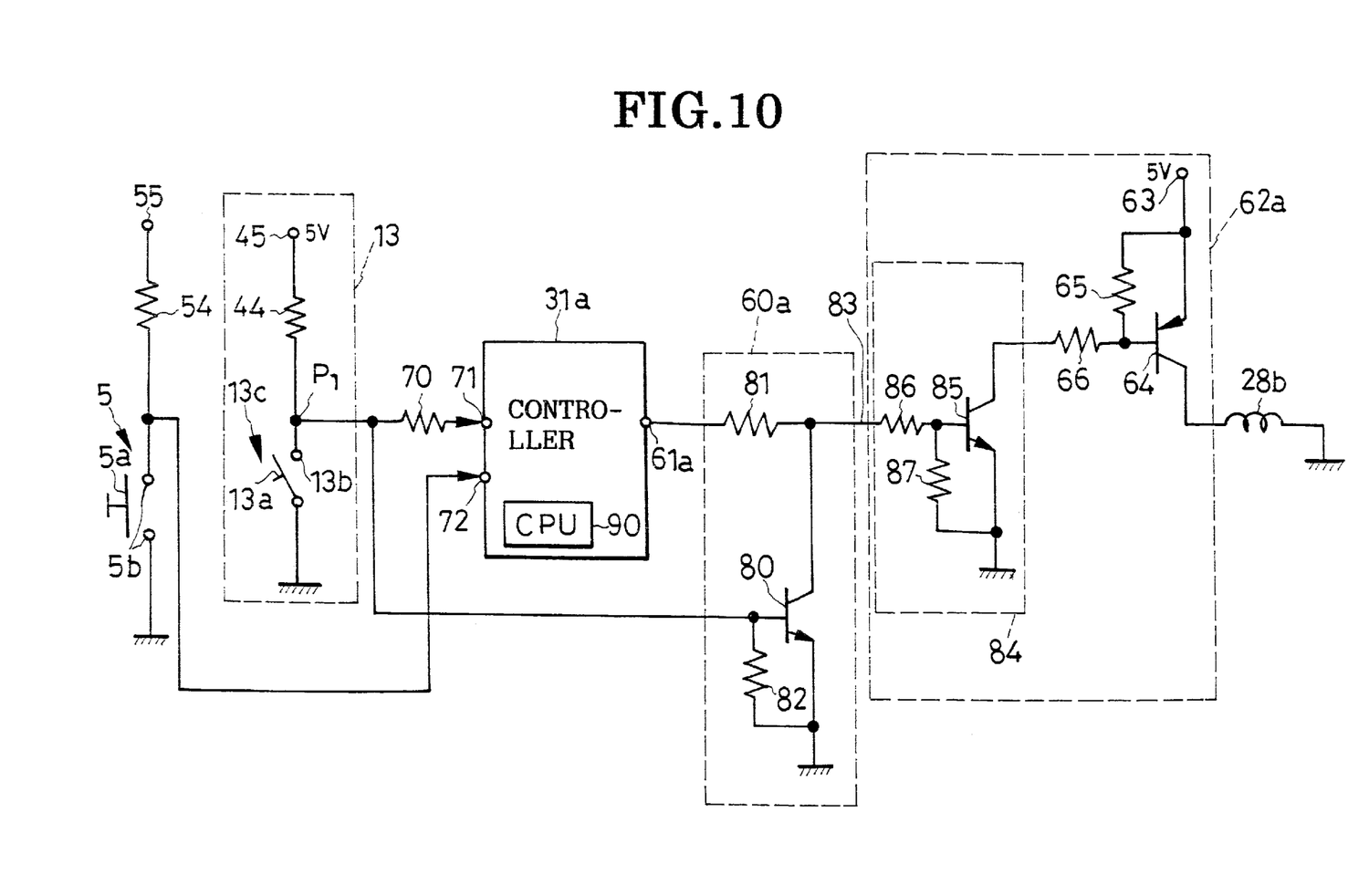
FIG. 10 is a partial schematic electrical diagram of an alternative electric circuitry of the FIGS. 1 and 2 CD-ROM drive.

The controller 31 and some associated components of the FIG. 8 electric circuitry of the FIG. 3 CD-ROM drive 2 may be modified as drawn in FIG. 10 within the purview of the instant invention. The FIG. 10 circuitry features a modified controller 31a, a modified solenoid protection circuit 60a, and a modified solenoid driver circuit 62a. This alternative circuitry can be akin in the other details of construction to the FIG. 8 circuitry and can be incorporated in a CD-ROM drive of the same mechanical make as depicted in FIGS. 1–7.

The modified controller 31a differs from its FIG. 8 counterpart 31 in that its output 61a, connected to the modified solenoid driver circuit 62a via the modified solenoid protection circuit 60a, goes high in response to the actuation of the eject switch 5 when the controller is functioning normally. The modified protection circuit 60a is designed to cause deenergization of the solenoid 28 upon tray ejection even when the controller output 61a remains high after tray ejection as a result of controller malfunctioning. The modified solenoid driver circuit 62a is designed to energize the solenoid 28 in response to a high output from the protection circuit 60a and to deenergize the solenoid in response to a low output from the protection circuit.

That objective of the protection circuit 60a can be accomplished by constructing the same as an inhibit AND gate. Thus the circuit 60a is shown to comprise an npn transistor 80 and two resistors 81 and 82. The transistor 80 has its collector connected to the resistor 81 and thence to the controller output 61a, its emitter grounded, and its base connected to the output $P_1$ of the tray sensor 13. The resistor 82 is connected between the base and emitter of the transistor 80. The output line 83 of the protection circuit 60a is connected to the collector of the transistor 80.

It will therefore be seen that the output 83 of the protection circuit 60a is high only when the controller output 61a is high and, at the same time, when the tray sensor output $P_1$ is low. Even if the controller output 61a remains high after tray ejection because of controller malfunctioning, the transistor 80 of the protection circuit 60a will conduct when the tray sensor output $P_1$ goes high upon tray ejection, grounding the controller output 61a. The protection circuit output 83 will then become low.

The solenoid driver circuit 62a incorporates an inverter circuit 84 for energizing the solenoid coil 28b in response to a high output from the protection circuit 60a and deenergizing the same in response to a low output therefrom. The driver circuit 62a is similar in the other details of construction to its FIG. 8 counterpart 62. The inverter circuit 84 comprises a switching transistor 85 and two resistors 86 and 87. The transistor 85 is of npn type, having a collector connected to the base of the transistor 64 via the resistor 66, an emitter grounded, and a base connected to the output line 83 of the protection circuit 60a via the resistor 86. The resistor 87 is connected between the base and emitter of the transistor 85.

Thus the transistor 85 will conductor when the protection circuit output line 83 is high. As the collector of this transistor 85 has a ground potential, the other transistor 64 will conduct thereby causing solenoid energization. When the protection circuit output goes low, on the other hand, the transistor 85 will become nonconductive, holding its collector high. The other transistor 64 will therefore be turned off, resulting in solenoid deenergization. The simple construction of the protection circuit 60a is among the advantages of this embodiment.

Third Form

Figure 11:
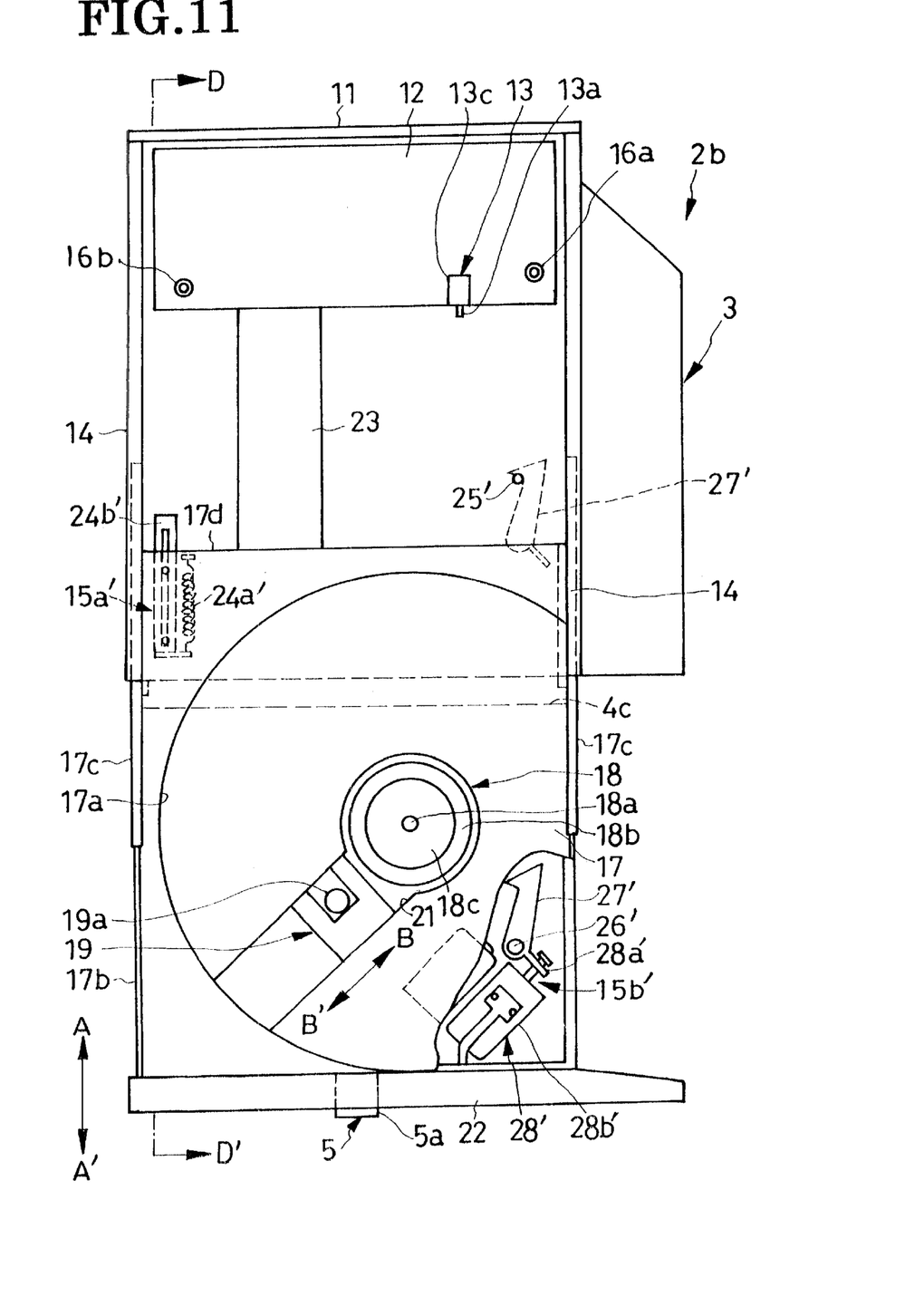
FIG. 11 is a view similar to FIG. 3 but showing a CD-ROM drive of different construction to which the present invention is applicable.
Figure 12:
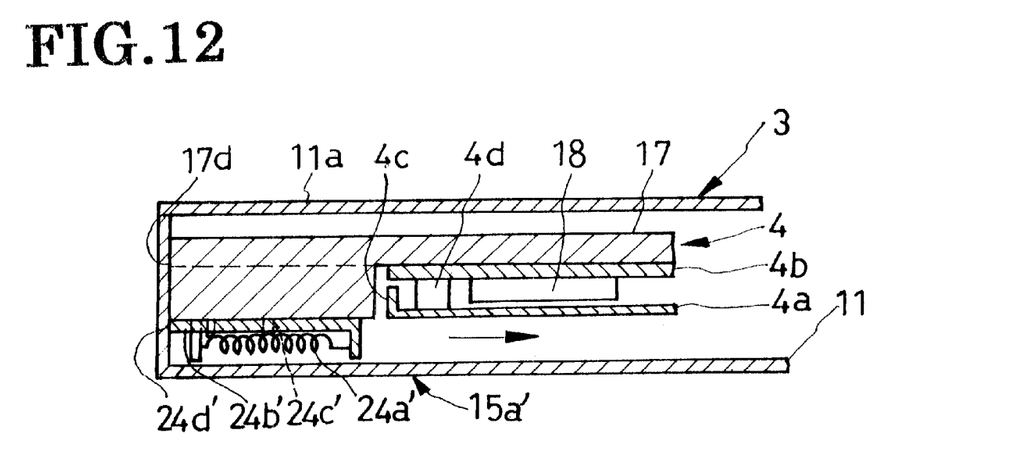
FIG. 12 is a fragmentary section taken along the line D–D' in FIG. 11, with the tray shown in the data transfer position.
Figure 13:
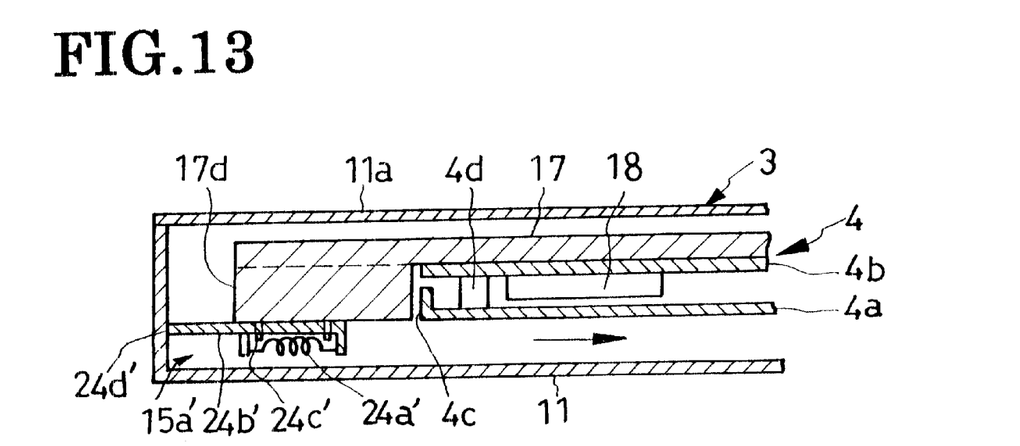
FIG. 13 is a view similar to FIG. 12 except that the tray is shown ejected toward the load/unload position.

The principles of this invention, as embodied specifically in the circuitry of FIG. 8 and that of FIG. 10, are applicable to a CD-ROM drive whose ejector mechanism and locking mechanism differ from the ejector mechanism 15a and locking mechanism 15b of the FIG. 3 CD-ROM drive 2. FIGS. 11–13 illustrate such a CD-ROM drive 2b having a different ejector mechanism 15a' and a different locking mechanism 15b'. The ejector mechanism 15a' and locking mechanism 15b' differ most from their FIG. 3 counterparts in that all the component parts of these mechanisms 15a' and 15b', only with the exception of the pin 25', FIG. 11, of the locking mechanism 15b', are mounted to the tray 17 instead of to the immovable segment 3 of the disk drive.

More specifically, as will be seen from all of FIGS. 11–13, the ejector mechanism 15a' has a slide 24b' mounted to the underside of the tray 17 for sliding motion relative to the same in the A–A' direction of FIG. 11 as guided by a pair of headed guide pins 24c' depending from the tray and slidably extending through a slot cut longitudinally in the slide. An ejector spring 24a', shown as a coiled tension spring, is anchored at one end to a spring retainer formed in one piece with the slide 24b' and, at the other end, to another spring retainer also affixed to the underside of the tray 17.

When locked in the data transfer position as in FIG. 12, the tray 17 has its rear or left hand end held against the rear wall of the CD-ROM drive casing 11, and so does the rear end 24d of the slide 24b' have its rear end 24d held against the casing rear wall. The ejector spring 24a' is now fully extended, storing therein the energy biasing the tray 17 toward the load/unload position.

When unlocked, the tray 17 will travel to the FIG. 13 position by virtue of the energy that has been stored in the ejector spring 24a', leaving the slide 24b' behind and in abutment against the casing rear wall. The tray 17 is to be subsequently manually pulled from this FIG. 13 position to the load/unload position of FIG. 11 The slide 24b' will then travel with the tray 17 to the load/unload position.

The locking mechanism 15b' has its solenoid 28' mounted to the underside of the tray 17, too. The solenoid 28' is operatively coupled to a hook 27' which is pinned at 26' to the tray for pivotal motion into and out of locking engagement with the pin 25' mounted fast on the bottom of the CD-ROM drive casing 11.

The electric circuitry of this CD-ROM drive 2b may be configured as shown in either FIG. 8 or FIG. 10. It will be appreciated that despite the difference in mechanical construction from the FIG. 3 CD-ROM drive 2, the FIG. 8 or 10 circuitry works equally well to protect the solenoid 28' from accidental overheating.

Despite the foregoing detailed disclosure it is not desired that the present invention be limited by the exact showing of the drawings or the description thereof. A variety of departures from the illustrated embodiments will suggest themselves to those skilled in the art on the basis of this disclosure. For instance, instead of a solenoid, a variety of other electric actuators, both linear and rotary, may be employed for tray ejection. Such actuators may be used, moreover, for ejecting the tray either halfway or all the way to the load/unload position. It is also understood that the present invention is applicable not only to CD-ROM drives or other optical disk drives but to magnetic disk drives and magneto-optic disk drives, as well as to other electronic devices such as printers.

All these and other modifications or alterations of the illustrated embodiments are intended in the foregoing disclosure. It is therefore appropriate that the invention be construed broadly and in a manner consistent with the fair meaning or proper scope of the claims which follow.

What is claimed is:

1. In an electronic device having a stationary segment and a movable segment, the movable segment being movable relative to the stationary segment between a first and a second position, in combination:
    (a) drive means for moving the movable segment from the first toward the second position relative to the stationary segment, the drive means including electric actuator means which, when activated, at least causes the movable segment to start traveling from the first toward the second position;
    (b) a sensor for sensing whether the movable segment is in the first position or not;
    (c) a controller for providing a signal for activating and deactivating the actuator means; and
    (d) a protection circuit having an input connected to the sensor, another input connected to the controller, and an output connected to the actuator means, for permitting the controller to activate the actuator means only when the movable segment is in the first position;
    (e) whereby the actuator means is protected against overheating from being accidentally held activated after the movable segment has traveled away from the first position toward the second position.

2. The invention of claim 1 wherein the sensor provides a binary signal indicative of whether the movable segment is in the first position or not, wherein the controller also provides a binary signal indicative of activation or deactivation of the actuator means, and wherein the protection circuit is a logic circuit for causing activation of the actuator means when the output signal of the controller indicates activation of the actuator means and, at the same time, when the output signal of the sensor indicates that the movable segment is in the first position.

3. The invention of claim 2 wherein the protection circuit is a gate circuit.

4. The invention of claim 2 wherein the protection circuit comprises a switching element connected between the controller and ground and responsive to the binary output signal of the sensor.

5. The invention of claim 2 wherein the sensor comprises:
    (a) a supply terminal;
    (b) a sensor switch connected between the supply terminal and ground and adapted to be closed when the movable segment is in the first position, and opened when the movable segments moves toward the second position;
    (c) a resistor connected between the supply terminal and the sensor switch; and
    (d) an output connected to a junction between the sensor switch and the resistor.

6. In an electronic device having a stationary segment and a movable segment, the movable segment being movable relative to the stationary segment between a first and a second position, in combination:

(a) resilient means for moving the movable segment from the first toward the second position relative to the stationary segment;

(b) locking means for locking the movable segment in the first position against the force of the resilient means;

(c) an electric actuator for causing, when actuated, the locking means to unlock the movable segment and hence for permitting the movable segment to travel from the first toward the second position under the force of the resilient means;

(d) an actuator driver circuit for activating and deactivating the actuator;

(e) a sensor for sensing whether the movable segment is in the first position or not;

(f) a controller for providing a signal for causing the actuator driver circuit to activate and deactivate the actuator; and (g) a protection circuit having an input connected to the sensor, another input connected to the controller, and an output connected to the actuator driver circuit, for permitting the actuator driver circuit to activate the actuator in response to the signal from the controller only when the movable segment is in the first position;

(h) whereby the actuator is protected against overheating from being accidentally held activated after the movable segment has traveled away from the first position toward the second position.

7. In an apparatus for data transfer with a rotating data storage disk, in combination;

(a) a casing;

(b) a tray for carrying a data storage disk, the tray being movable relative to the casing between a data transfer position and a load/unload position;

(c) drive means for moving the tray from the data transfer position toward the load/unload position, the drive means including electric actuator means which, when activated, at least causes the tray to start traveling from the data transfer toward the load/unload position;

(d) a tray sensor for sensing whether the tray is in the data transfer position or not;

(e) a controller for providing an eject signal for activating and deactivating the actuator means; and (f) a protection circuit having inputs connected to the tray sensor and the controller, and an output connected to the actuator means, for permitting the controller to activate the actuator means only when the tray is in the data transfer position;

(g) whereby the actuator means is protected against overheating from being accidentally held activated after the tray has traveled away from the data transfer position toward the load/unload position.

8. An apparatus for data transfer with a rotating data storage disk, comprising;

(a) a stationary segment;

(b) a movable segment comprising a tray for carrying a data storage disk, a disk drive motor mounted to the tray for imparting rotation to the disk, and a transducer mounted to the tray for data transfer with the disk, the movable segment being movable relative to the stationary segment between a data transfer position, where the disk makes data transfer with the transducer, and a load/unload position where the disk is loaded on and unloaded from the tray;

(c) resilient means for moving the movable segment from the data transfer position toward the load/unload position;

(d) locking means for locking the movable segment in the data transfer position against the force of the resilient means;

(e) an electric actuator for causing, when actuated, the locking means to unlock the movable segment and hence for permitting the movable segment to travel from the data transfer toward the load/unload position under the force of the resilient means;

(f) an actuator driver circuit for activating and deactivating the actuator;

(g) a sensor for sensing whether the movable segment is in the data transfer position or not;

(h) a controller for controlling the operation of the apparatus, the controller providing a signal for causing the actuator driver circuit to activate and deactivate the actuator; and (i) a protection circuit having an input connected to the sensor, another input connected to the controller, and an output connected to the actuator driver circuit, for permitting the actuator driver circuit to activate the actuator in response to the signal from the controller only when the movable segment is in the data transfer position;

(j) whereby the actuator is protected against overheating from being accidentally held activated after the movable segment has traveled away form the data transfer position toward the load/unload position.

9. The rotating disk data storage apparatus of claim 8 wherein the actuator is a solenoid.

* * * * *

UNITED STATES PATENT AND TRADEMARK OFFICE
CERTIFICATE OF CORRECTION

PATENT NO. : 6,625,098 B1 Page 1 of 1
DATED : September 23, 2003
INVENTOR(S) : Minoru Minase and Shigeru Fukinuki It is certified that error appears in the above-identified patent and that said Letters Patent is hereby corrected as shown below:

<u>Column 5,</u>
Line 11, delete "A'A'" and insert -- A-A' -- therefor;

<u>Column 7,</u>
Line 55, delete "on-of" and insert -- on-off -- therefor;

<u>Column 13,</u>
Line 39, delete both occurrences of "24d" and insert -- 24d' -- therefor.

Signed and Sealed this

Tenth Day of February, 2004

JON W. DUDAS
*Acting Director of the United States Patent and Trademark Office*